(12) United States Patent
Ehara et al.

(10) Patent No.: US 12,482,820 B2
(45) Date of Patent: Nov. 25, 2025

(54) NEGATIVE ELECTRODE FOR ALKALINE STORAGE BATTERY AND ALKALINE STORAGE BATTERY INCLUDING THE NEGATIVE ELECTRODE

(71) Applicant: FDK CORPORATION, Tokyo (JP)

(72) Inventors: Yuki Ehara, Tokyo (JP); Jun Ishida, Tokyo (JP); Shota Ohata, Tokyo (JP); Akira Saguchi, Tokyo (JP); Masaru Kihara, Tokyo (JP)

(73) Assignee: FDK CORPORATION, Tokyo (JP)

( * ) Notice: Subject to any disclaimer, the term of this patent is extended or adjusted under 35 U.S.C. 154(b) by 514 days.

(21) Appl. No.: 17/663,383

(22) Filed: May 13, 2022

(65) Prior Publication Data

US 2022/0384808 A1 Dec. 1, 2022

(30) Foreign Application Priority Data

May 28, 2021 (JP) .................................. 2021-090605

(51) Int. Cl.
*H01M 4/58* (2010.01)
*H01M 4/02* (2006.01)
*H01M 4/36* (2006.01)
*H01M 4/62* (2006.01)

(52) U.S. Cl.
CPC ........... *H01M 4/582* (2013.01); *H01M 4/364* (2013.01); *H01M 4/366* (2013.01); *H01M 4/626* (2013.01); *H01M 2004/021* (2013.01); *H01M 2004/027* (2013.01)

(58) Field of Classification Search
CPC ...... H01M 4/582; H01M 4/364; H01M 4/366; H01M 4/626; H01M 2004/021; H01M 2004/027
See application file for complete search history.

(56) References Cited

U.S. PATENT DOCUMENTS

2007/0210279 A1* 9/2007 Kawakatsu ............ H01M 4/32
252/182.1
2009/0047576 A1 2/2009 Okabe et al.

FOREIGN PATENT DOCUMENTS

| CN | 106563479 A | 4/2017 | |
|---|---|---|---|
| JP | H10134806 A | 5/1998 | |
| JP | 1998294109 | * 11/1998 | ............ Y02E 60/10 |
| JP | 2001266860 A | 9/2001 | |

(Continued)

OTHER PUBLICATIONS

Machine Translation—JP1998294109 (Year: 1998).*

(Continued)

*Primary Examiner* — Ula C Ruddock
*Assistant Examiner* — Sarika Gupta
(74) *Attorney, Agent, or Firm* — Kinney & Lange, P.A.

(57) ABSTRACT

A negative electrode for an alkaline storage battery that achieves both an improvement in cycle life and an improvement in low temperature discharge characteristics, and an alkaline storage battery including the negative electrode are disclosed. The negative electrode for an alkaline storage battery includes a negative electrode core body formed of metal, and a negative electrode mixture layer which contains at least a hydrogen storage alloy and yttrium fluoride, and is carried on the negative electrode core body. Particles of the yttrium fluoride are formed so that the average particle size thereof is equal to 1 μm or more and 7 μm or less.

3 Claims, 2 Drawing Sheets

(56) References Cited

FOREIGN PATENT DOCUMENTS

| | | | |
|---|---|---|---|
| JP | 2007012573 A | 1/2007 | |
| JP | 2014192032 A | 10/2014 | |
| JP | 2016149299 A | * 8/2016 | ............. Y02E 60/10 |

OTHER PUBLICATIONS

Machine Translation—JP 2016149299 A (Year: 2016).*
Extended European Search Report dated Oct. 7, 2022, for corresponding European Application No. 22173778.6.

* cited by examiner

FIG. 2

| | ADDITIVE | YF3 PARTICLE SIZE (μm) | CYCLE LIFE TIME RATIO (COMPARED WITH COMPARATIVE EXAMPLE 1, %) | LOW-TEMPERATURE DISCHARGE RATIO (%) |
|---|---|---|---|---|
| COMPARATIVE EXAMPLE 1 | NO ADDITIVE | – | 100 | 75.8 |
| COMPARATIVE EXAMPLE 2 | YF3 | 0.8 | 120 | 75.1 |
| EXAMPLE 1 | YF3 | 1 | 134 | 82.2 |
| EXAMPLE 2 | YF3 | 3 | 143 | 82.8 |
| EXAMPLE 3 | YF3 | 7 | 116 | 78.7 |

# NEGATIVE ELECTRODE FOR ALKALINE STORAGE BATTERY AND ALKALINE STORAGE BATTERY INCLUDING THE NEGATIVE ELECTRODE

CROSS-REFERENCE TO RELATED APPLICATION(S)

This application claims priority to Japanese Application No. 2021-090605 filed on May 28, 2021, which is incorporated herein by reference in its entirety.

BACKGROUND

Technical Field

The present disclosure relates to a negative electrode for an alkaline storage battery and an alkaline storage battery including the negative electrode.

Description of the Related Art

An alkaline storage battery includes an electrode group in which a positive electrode plate, a negative electrode plate, and a separator are laminated. In the electrode group, the separator is arranged between the positive electrode plate and the negative electrode plate. In the alkaline storage battery, for example, the electrode group is wound in a spiral shape, and accommodated together with an alkaline electrolytic solution in a cylindrical outer packaging can having electric conductivity. In the alkaline storage battery, a predetermined electrochemical reaction induced between the positive electrode plate and the negative electrode plate which face each other via the separator, whereby charging and discharging are performed. For example, Japanese Patent Laid-Open No. 2016-149299 describes a nickel-metal hydride secondary battery as an example of the alkaline storage battery.

Since nickel-metal hydride secondary batteries have a high capacity and are excellent in environmental safety, they have been used in various applications such as compatibility with alkaline batteries, backup power sources, and in-vehicle intended use. As described above, since the applications are expanding, in order to extend the life (improve the cycle life) of the nickel-metal hydride secondary batteries, various methods such as suppression of pulverization by adding Co to hydrogen storage alloy, suppressing of corrosion by subjecting the surface of the alloy to an alkali treatment have been studied.

With respect to conventional nickel-metal hydride secondary batteries, it has been found that the cycle life is improved by adding Co to alloy or subjecting the surface of alloy to an alkali treatment, but in general the reactivity of the alloy is deteriorated, and the discharge characteristic, particularly at low temperature, is deteriorated. As described above, it has been difficult in the nickel-metal hydride secondary batteries to achieve both the improvement of the cycle life and the improvement of the low-temperature discharge characteristic.

The present disclosure has been made in view of such problems, and has an object to provide a negative electrode for an alkaline storage battery that achieves both improvement of cycle life and improvement of low-temperature discharge characteristic, and an alkaline storage battery including the negative electrode.

SUMMARY

In order to attain the above object, a negative electrode for an alkaline storage battery according to the present disclosure comprises a negative electrode core body formed of metal, and a negative electrode mixture layer that contains at least a hydrogen storage alloy and yttrium fluoride and is carried on the negative electrode core body, wherein particles of the yttrium fluoride are formed so that an average particle size thereof is equal to 1 µm or more and 7 µm or less.

According to the negative electrode for an alkaline storage battery according to the present disclosure, the particles of yttrium fluoride contained in the negative electrode mixture layer are formed so that the average particle size thereof is equal to 1 µm or more and 7 µm or less. Therefore, when the negative electrode is used for an alkaline storage battery, the characteristics of yttrium fluoride enhances the reactivity of the hydrogen storage alloy during low-temperature discharging, and suppresses the corrosion of the hydrogen storage alloy by the alkaline electrolytic solution. Specifically, the characteristics of yttrium enhance the reactivity of the hydrogen storage alloy during low-temperature discharging, and the characteristics of fluorine suppress the corrosion of the hydrogen storage alloy by the alkaline electrolytic solution. Furthermore, since the average particle size of the particles of yttrium fluoride is set to 1 µm or more and 7 µm or less, the particles of yttrium fluoride can be sufficiently dispersed in the hydrogen storage alloy, and the reactivity of the hydrogen storage alloy during low temperature discharging is further enhanced, and the corrosion of the hydrogen storage alloy by the alkaline electrolytic solution is more surely suppressed. In this way, it is possible to provide a negative electrode for an alkaline storage battery that achieves both an improvement in cycle life and an improvement in low-temperature discharge characteristics.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein:

FIG. 2 shows the results of a cycle test and a low-temperature discharging test of an alkaline storage battery according to an example together with a comparative example.

DETAILED DESCRIPTION

Figure 1:
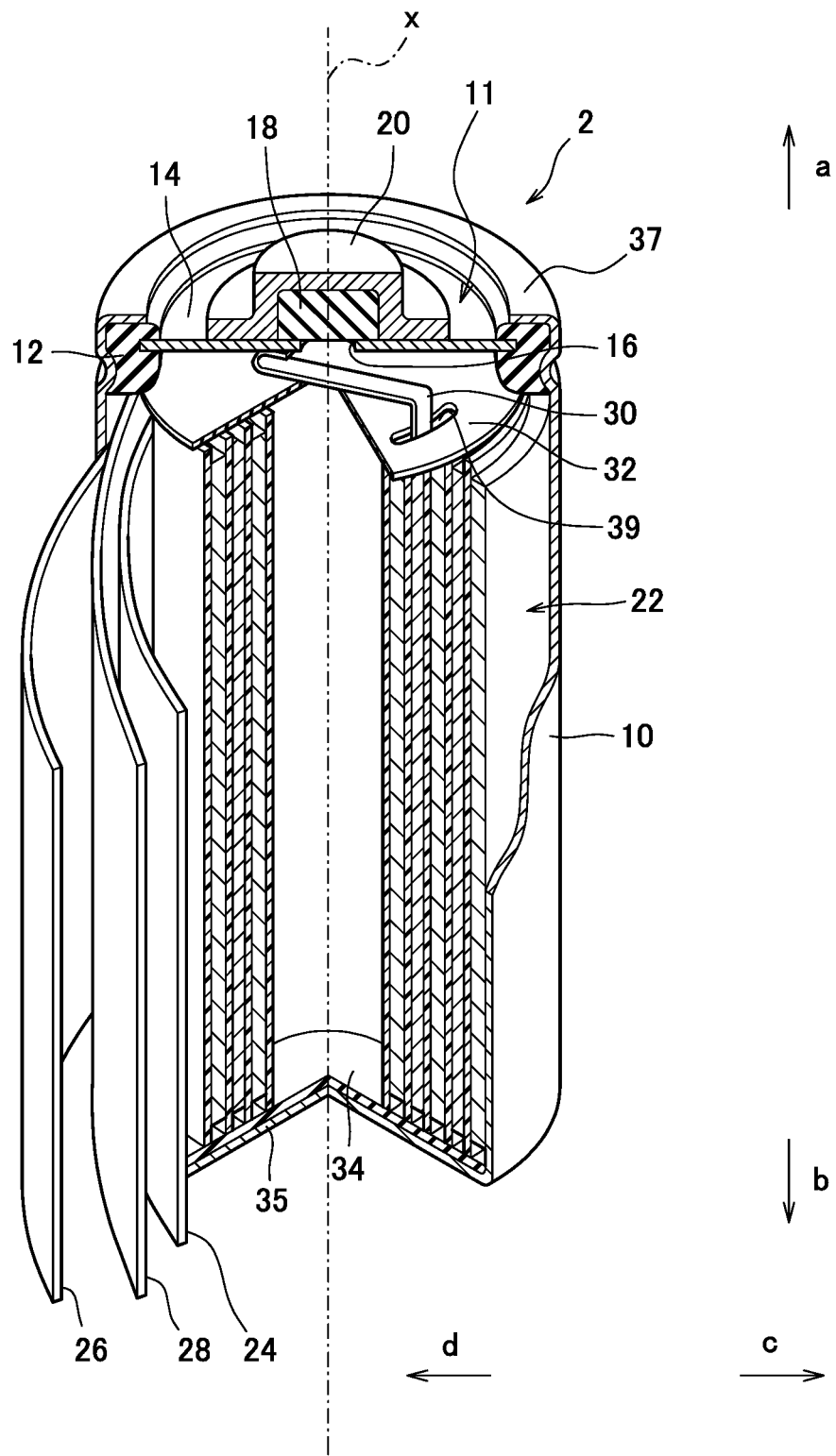
FIG. 1 is a perspective view showing a partially broken alkaline storage battery according to an embodiment.

Hereinafter, an embodiment of a nickel-metal hydride secondary battery 2 (hereinafter, also simply referred to as "battery 2") will be described as an example of an alkaline storage battery according to an embodiment. An AA size cylindrical battery 2 will be described as an embodiment. However, the battery 2 is not limited to this type, and another size such as AAA size may be used, or for example, a square battery may be used.

FIG. 1 is a perspective view showing a partially broken nickel-metal hydride secondary battery 2 (alkaline storage battery) according to the embodiment. FIG. 2 shows results of a cycle test and a low-temperature discharging test of batteries 2 according to examples together with those of comparative examples. For convenience of description, with respect to an axis x of a cylindrical outer packaging can 10, the direction of an arrow a indicates an upper side, and the direction of an arrow b indicates a lower side. Here, the upper side means a side on which a positive electrode terminal 20 of the battery 2 is provided, and the lower side means a side on which a bottom wall 35 of the battery 2 is provided and also means the opposite side to the upper side. Further, with respect to a direction perpendicular to the axis x (hereinafter, also referred to as "radial direction"), a direction which is away from the axis x indicates an outer circumferential side (the direction of an arrow c), and a direction which directs to the axis x indicates an inner circumferential side (the direction of an arrow d).

As shown in FIG. 1, the battery 2 includes an outer packaging can 10 having a bottomed cylindrical shape with an upper side thereof (the direction of the arrow a) being opened. The outer packaging can 10 has electrical conductivity, and a bottom wall 35 provided on the lower side (the direction of the arrow b) functions as a negative electrode terminal. A sealing body 11 is fixed to the opening of the outer packaging can 10. The sealing body 11 includes a lid plate 14 and a positive electrode terminal 20, and seals the outer packaging can 10. The lid plate 14 is a disk-shaped member having electrical conductivity. A lid plate 14 and a ring-shaped insulating packing 12 surrounding the lid plate 14 are arranged in the opening of the outer packaging can 10, and the insulating packing 12 is fixed to an opening edge 37 of the outer packaging can 10 by caulking the opening edge 37 of the outer packaging can 10. In other words, the lid plate 14 and the insulating packing 12 cooperate with each other to airtightly close the opening of the outer packaging can 10.

Here, the lid plate 14 includes a central through-hole 16 in the center thereof, and a rubber valve body 18 that blocks the central through-hole 16 is arranged on an outer surface which is a surface on the upper side of the lid plate 14. Further, a metal positive electrode terminal 20 having a cylindrical shape with a flange is electrically connected onto the outer surface of the lid plate 14 so as to cover the valve body 18. The positive electrode terminal 20 presses the valve body 18 against the lid plate 14. The positive electrode terminal 20 is provided with a gas vent hole (not shown).

Normally, the central through-hole 16 is airtightly closed by the valve body 18. On the other hand, if gas is generated in the outer packaging can 10 and the pressure of the gas increases, the valve body 18 is compressed by the pressure of the gas to open the central through-hole 16, so that the gas is discharged from the inside of the outer packaging can 10 to the outside thereof through the center through-hole 16 and a gas vent hole (not shown) of the positive electrode terminal 20. In other words, the central through-hole 16, the valve body 18, and the positive electrode terminal 20 form a safety valve for the battery 2.

As shown in FIG. 1, a spiral electrode group 22 (electrode group) is accommodated in the outer packaging can 10. This spiral electrode group 22 is formed by laminating a belt-shaped positive electrode 24, a belt-shaped negative electrode 26, and a belt-shaped separator 28, respectively. The spiral electrode group 22 is formed in a spiral shape with the separator 28 being interposed between the positive electrode 24 and the negative electrode 26. In other words, the positive electrode 24 and the negative electrode 26 are laminated on each other in a radial direction via the separator 28. The outermost circumferential side of the spiral electrode group 22 is formed by a part of the negative electrode 26, and is in contact with a wall facing the inner circumferential side of the outer packaging can 10. In other words, the negative electrode 26 and the outer packaging can 10 are electrically connected to each other.

A positive electrode lead 30 is arranged between an end portion on the upper side of the spiral electrode group 22 and the lid plate 14 in the outer packaging can 10. Specifically, one end of the positive electrode lead 30 is connected to the positive electrode 24, and the other end thereof is connected to the lid plate 14. Therefore, the positive electrode terminal 20 and the positive electrode 24 are electrically connected to each other via the positive electrode lead 30 and the lid plate 14. A circular upper insulating member 32 is arranged between the lid plate 14 and the spiral electrode group 22, and the positive electrode lead 30 extends through a slit 39 provided in the upper insulating member 32. Further, a circular lower insulating member 34 is also arranged between the spiral electrode group 22 and the bottom wall 35 of the outer packaging can 10.

Further, a predetermined amount of alkaline electrolytic solution (not shown) is injected into the outer packaging can 10. This alkaline electrolytic solution is impregnated in the spiral electrode group 22, and induces an electrochemical reaction (charging/discharging reaction) during charging/discharging between the positive electrode 24 and the negative electrode 26. It is preferable that an aqueous solution containing at least one kind of KOH, NaOH and LiOH as a solute is used as the alkaline electrolytic solution.

For example, a polyamide fiber nonwoven fabric to which a hydrophilic functional group is imparted, a polyolefin fiber nonwoven fabric of polyethylene, polypropylene or the like to which a hydrophilic functional group is imparted, or the like can be used as the material of the separator 28. Specifically, it is preferable to use a nonwoven fabric made of a polyolefin fiber which has been subjected to a sulfonate treatment to be imparted with a sulfone group. Here, the sulfone group is imparted by treating the nonwoven fabric with an acid containing a sulfuric acid group such as sulfuric acid or fuming sulfuric acid. When the separator is subjected to the sulfonate treatment as described above, it not only imparts hydrophilicity, but also contributes to suppressing self-discharge of the battery.

The positive electrode 24 includes an electrically conductive positive electrode base material having a porous structure, and a positive electrode mixture held in pores of the positive electrode base material. For example, nickel-plated net-like, sponge-like or fibrous metal body, or foamed nickel (nickel foam) can be used as the positive electrode base material as described above. The positive electrode mixture includes positive electrode active material particles, an electrically conductive agent, a positive electrode additive and a binder.

The binder of the positive electrode mixture serves to bind the positive electrode active material particles, the electrically conductive agent, and the positive electrode additive, and at the same time, bind the positive electrode mixture to the positive electrode base material. Here, as the binder may be used, for example, carboxymethyl cellulose, methyl cellulose, PTFE (polytetrafluoroethylene) dispersion, HPC (hydroxypropyl cellulose) dispersion or the like. Further, a material which is appropriately selected as necessary in order to improve the characteristics of the positive electrode is added as the positive electrode additive. Main examples of the positive electrode additive include yttrium oxide, zinc oxide, cobalt hydroxide, and the like.

Nickel hydroxide particles which are generally used for nickel hydrogen secondary batteries are used as the positive electrode active material particles. It is preferable that higher-order nickel hydroxide particles are adopted as the nickel hydroxide particles. It is preferable that at least one kind of zinc, magnesium and cobalt is dissolved in these nickel hydroxide particles. The positive electrode active material particles as described above are manufactured by a manufacturing method which is generally used for nickel-metal hydride secondary batteries. Further, for example, one or more kinds selected from cobalt compounds such as cobalt oxide (CoO) and cobalt hydroxide (Co(OH)$_2$) and cobalt (Co) may be used as the electrically conductive agent. This electrically conductive agent is added to the positive electrode mixture as needed, and it may be added to and contained in the positive electrode mixture in the form of powder or a coating covering the surface of the positive electrode active material.

The positive electrode 24 can be manufactured, for example, as follows. First, a positive electrode mixture slurry containing positive electrode active material powder comprising positive electrode active material particles, an electrically conductive agent, a positive electrode additive, water and a binder is prepared. The thus-obtained positive electrode mixture slurry is filled in, for example, a nickel foam, and dried. After drying, the nickel foam filled with nickel hydroxide particles and the like is rolled and then cut into a predetermined shape. As a result, the positive electrode 24 holding the positive electrode mixture is manufactured.

Next, the negative electrode 26 will be described. The negative electrode 26 includes a negative electrode core body formed of metal, and a negative electrode mixture layer carried on the negative electrode core body, and is formed to have a belt-shape as a whole. The negative electrode core body has electrical conductivity. The negative electrode core body is a belt-shaped metal material in which through-holes (not shown) are distributed, and for example, a punching metal sheet can be used. The negative electrode mixture layer is formed of a negative electrode mixture which is coated in the form of a layer on both sides (front surface and back surface) of the negative electrode core body. The negative electrode mixture is not only filled in the through-holes of the negative electrode core body, but also is carried in the form of a layer on the front and back surfaces of the negative electrode core body to form the negative electrode mixture layer. The negative electrode mixture includes particles of hydrogen storage alloy capable of storing and releasing hydrogen as a negative electrode active material, yttrium fluoride (hereinafter, also referred to as YF3), an electrically conductive agent, a binder, and a negative electrode auxiliary agent.

Here, the hydrogen storage alloy is an alloy capable of storing and releasing hydrogen which is a negative electrode active material. The hydrogen storage alloy in the hydrogen storage alloy particles is not particularly limited, and materials which are used for general nickel-metal hydride secondary batteries are preferably used as the hydrogen storage alloy. For example, the hydrogen storage alloy may be a rare earth-Mg—Ni-based hydrogen storage alloy containing a rare earth element, Mg, and Ni. It is preferable that the particles of the hydrogen storage alloy are formed so that the volume average particle size (MV) thereof is equal to 15 μm or more and 90 μm or less. In the present specification, the volume average particle size (MV) of the particles of the hydrogen storage alloy is defined as follows. A particle size distribution of the particles of the hydrogen storage alloy is measured by a laser diffraction/scattering type particle size distribution measuring apparatus (machine name: SRA-150, MT-3300 manufactured by Microtrac company), and the volume average particle size (MV) means an average particle size which corresponds to 50% in integration based on the volume.

The particles of yttrium fluoride are formed so that the average particle size is equal to 1 μm or more and 7 μm or less, preferably 1 μm or more and 3 μm or less. In the present specification, the average particle size of the particles of yttrium fluoride is defined as follows. A particle size distribution is measured by a laser diffraction/scattering type particle size distribution measuring apparatus (machine name: HRA manufactured by Microtrac company), and the average particle size means a particle size at which the cumulative frequency in all particles is equal to 50% (D50).

The particles of hydrogen storage alloy and the particles of yttrium fluoride are obtained, for example, as follows. First, metal raw materials are measured in weight and mixed so as to have a predetermined composition, and an ingot made from this mixture by a predetermined production method is prepared. The obtained ingot is pulverized and sieved by using a classifier to obtain particles of hydrogen storage alloy and particles of yttrium fluoride having desired particle sizes.

Further, the binder of the negative electrode mixture servers to bind the particles of hydrogen storage alloy, the electrically conductive agent and the like to one another and at the same time bind the particles of hydrogen storage alloy, the electrically conductive agent and the like to the negative electrode core body. Here, the binder is not particularly limited, and for example, a binder which is generally used for nickel-metal hydride secondary batteries such as a hydrophilic or hydrophobic polymer or carboxymethyl cellulose may be used as the binder. Further, styrene-butadiene rubber, sodium polyacrylate, or the like may be used as the negative electrode auxiliary agent. An electrically conductive agent which is generally used for the negative electrodes of nickel-metal hydride secondary batteries is used as the electrically conductive agent. For example, carbon black or the like is used.

The negative electrode 26 can be manufactured, for example, as follows. First, hydrogen storage alloy powder which is aggregates of hydrogen storage alloy particles as described above, yttrium fluoride, an electrically conductive agent, a binder, and water are prepared. At this time, with respect to the hydrogen storage alloy powder and yttrium fluoride, metal raw materials are measured in weight and mixed so as to have a predetermined composition, an ingot made from this mixture by a predetermined production method is prepared, and the thus-obtained ingot is pulverized and sieved by using a classifier to obtain particles of hydrogen storage alloy and particles of yttrium fluoride having desired particle sizes. These materials are kneaded to prepare a paste of the negative electrode mixture. The thus-obtained paste is coated on the negative electrode core body, and dried. Thereafter, the resultant is subjected to rolling as a whole to increase the packing density of the hydrogen storage alloy and yttrium fluoride, and then cut into a predetermined shape to manufacture the negative electrode 26.

The positive electrode 24 and the negative electrode 26 manufactured as described above are spirally wound with the separator 28 interposed therebetween to form a spiral electrode group 22. The thus-obtained spiral electrode group 22 is accommodated in the outer packaging can 10. Subsequently, a predetermined amount of alkaline electrolytic solution is injected into the outer packaging can 10. Thereafter, the outer packaging can 10 in which the spiral electrode group 22 and the alkaline electrolytic solution are accommodated is sealed by the sealing body 11 having the positive electrode terminal 20, thereby obtaining the battery 2 according to the embodiment. The battery 2 is subjected to an initial activation treatment to be ready for use.

Next, the actions and effects of the negative electrode 26 and the battery 2 of the embodiment will be described. As described above, according to the negative electrode 26 of the embodiment, the yttrium fluoride particles contained in the negative electrode mixture layer are formed so that the average particle size thereof is equal to 1 μm or more and 7 μm or less, preferably 1 μm or more and 3 μm or less. Therefore, when the negative electrode 26 is used for the battery 2, the characteristics of the yttrium fluoride enhances the reactivity of the hydrogen storage alloy during low-temperature discharging, and suppresses corrosion of the hydrogen storage alloy by the alkaline electrolytic solution. Specifically, the characteristics of yttrium enhance the reactivity of the hydrogen storage alloy during low-temperature discharging, and the characteristics of fluorine suppresses the contact between the hydrogen storage alloy and the alkaline electrolytic solution, thereby suppressing the corrosion of the hydrogen storage alloy by the alkaline electrolytic solution. Further, since the average particle size of the yttrium fluoride particles is set to 1 μm or more and 7 μm or less, preferably 1 μm or more and 3 μm or less, the yttrium fluoride particles can be sufficiently dispersed (spotted) in the hydrogen storage alloy. Therefore, the reactivity of the hydrogen storage alloy during low-temperature discharging is further enhanced. Further, the corrosion of the hydrogen storage alloy by the alkaline electrolytic solution is more surely suppressed, and the consumption of the alkaline electrolytic solution caused by the corrosion of the hydrogen storage alloy is reduced, thereby improving the cycle life. In this way, it is possible to provide the negative electrode 26 for the nickel-metal hydride secondary battery 2 and the battery 2 that achieve both the improvement of the cycle life and the improvement of the low-temperature discharge characteristics.

Here, when the yttrium fluoride particles have an average particle size larger than the above-mentioned desired range, yttrium fluoride cannot be sufficiently dispersed into the hydrogen storage alloy. In other words, the distribution of yttrium fluoride is localized. Further, when the yttrium fluoride particles have an average particle size smaller than the above-mentioned desired range, the yttrium fluoride particles aggregate, so that it is impossible to sufficiently disperse yttrium fluoride into the hydrogen storage alloy. As described above, when the average particle size of the yttrium fluoride particles is outside the desired range, the reactivity of the hydrogen storage alloy during low-temperature discharging cannot be sufficiently enhanced, and the corrosion of the hydrogen storage alloy by the alkaline electrolytic solution cannot be sufficiently suppressed.

According to the negative electrode 26 of the embodiment, the particles of hydrogen storage alloy are formed so that the average particle size thereof is equal to 15 μm or more and 90 μm or less. Therefore, even when agglomeration of the yttrium fluoride particles occurs, it is considered that the agglomeration of the yttrium fluoride particles can be cracked by the particles of the hydrogen storage alloy. When aggregates of the yttrium fluoride particles can be cracked, the yttrium fluoride can be sufficiently dispersed (spotted) in the hydrogen storage alloy. As a result, the reactivity of the hydrogen storage alloy during low-temperature discharging is enhanced, and the corrosion of the hydrogen storage alloy by the alkaline electrolytic solution is suppressed. In this way, it is possible to provide the negative electrode 26 for the nickel-metal hydride secondary battery 2 and the battery 2 that achieve both the improvement of the cycle life and the improvement of the low-temperature discharge characteristics.

Here, when the particles of hydrogen storage alloy have an average particle size larger than a desired range (15 μm to 90 μm), it is considered that the distance between the particles of hydrogen storage alloy increases, and thus the aggregates of the particles of yttrium fluoride cannot be cracked. Further, when the particles of hydrogen storage alloy have an average particle size smaller than the desired range (15 μm to 90 μm), it is considered that the alloy particles aggregate, and thus behave as pseudo large particles due to the aggregation of the alloy particles, so that the aggregates of the yttrium fluoride cannot be cracked.

1. Manufacturing of Battery

Example 1

(1) Preparation of Positive Electrode

Aqueous sodium hydroxide solution was gradually added to a mixed aqueous solution of nickel sulfate, zinc sulfate, magnesium sulfate, and cobalt sulfate while stirring the mixed aqueous solution so as to contain 3% by weight of zinc, 0.4% by weight of magnesium and 1% by weight of cobalt with respect to metallic nickel, thereby stabilizing the pH during the reaction to 13 to 14 and eluting nickel hydroxide. This eluted substance was washed 3 times with pure water whose amount was 10 times as large as the eluted substance, and then subjected to dehydration and drying steps to prepare a nickel hydroxide active material. Next, 10% by weight of cobalt hydroxide, 0.5% by weight of yttrium oxide, 40% by weight of HPC dispersion liquid, and 0.3% by weight of zinc oxide were mixed with the active material to prepare an active material slurry. This active material slurry was filled in foamed nickel, dried, rolled, and then cut at a predetermined size to prepare a positive electrode.

(2) Fabrication of Negative Electrode 0.4 parts by weight of sodium polyacrylate, 0.1 parts by weight of carboxymethyl cellulose (CMC), 2.0 parts by weight of dispersion of 50% of solid content of styrene butadiene rubber (SBR), 0.5 parts by weight of Ketjen Black, 0.1 part by weight of YF3 powder having an average particle size=1 μm, and 30 parts by weight of water were added to 100 parts by weight of powder of hydrogen storage alloy having an average particle size MV=65 μm, and kneaded to prepare a paste of negative electrode mixture. With respect to the hydrogen storage alloy and YF3, an ingot manufactured by a predetermined manufacturing method was crushed and sieved by using a classifier to obtain particles of hydrogen storage alloy having a desired particle size (average particle size MV=65 μm) and particles of YF3 (average particle size=1 μm). This paste was uniformly coated on both sides of an iron perforated plate which had a nickel-plated surface and was used as a negative electrode core. After the paste was dried, the perforated plate to which the hydrogen storage alloy powder was attached, that is, the negative electrode core, was further rolled to increase the amount of alloy per volume and cut at a predetermined size to prepare a negative electrode.

(3) Fabrication of Nickel-Metal Hydride Secondary Battery and Initial Activation Treatment The negative electrode and the positive electrode produced in the above steps were combined with each other, and wound together with the separator 28, and a predetermined amount of an electrolytic solution including NaOH, KOH, and LiOH solutions was injected to prepare a nickel-metal hydride secondary battery having a nominal capacity of 2000 mAh. Thereafter, this battery was charged at 0.2 A for 16 hours, and then repeatedly discharged five times at 0.4 A until the battery voltage became 1.0 V, thereby activating the battery.

Example 2

A nickel-metal hydride secondary battery was manufactured in the same manner as the battery of Example 1 except that yttrium fluoride (YF3) having an average particle size of 3 μm was used.

Example 3

A nickel-metal hydride secondary battery was manufactured in the same manner as the battery of Example 1 except that yttrium fluoride (YF3) having an average particle size of 7 μm was used.

Comparative Example 1

A nickel-metal hydride secondary battery was manufactured in the same manner as the battery of Example 1 except that yttrium fluoride (YF3) having an average particle size of 0.8 μm was used.

Comparative Example 2

A nickel-metal hydride secondary battery was manufactured in the same manner as the battery of Example 1 except that no yttrium fluoride (YF3) was added to the negative electrode mixture.

2. Evaluation of Nickel-Metal Hydride Secondary Battery

[Battery Characterization (Cycle Test)]

A cycle life evaluation was conducted on the battery manufactured in the above steps under a condition of "charging: 2 A ($\Delta V$=−10 mV), pause: 20 min, discharging: 2 A (End V=1.0V), pause: 10 min". Note that $\Delta V$=−10 mV means charging under so-called −$\Delta V$ control (hereinafter, simply referred to as −$\Delta V$ charging) in which charging is terminated when a battery voltage reaches a maximum value and then drops by 10 mV from this maximum value. Charging and discharging under the above-mentioned condition were repeated, and a time point at which discharging was impossible or the discharge capacity decreased to less than 60% of the discharge capacity in the first cycle was defined as the cycle life.

As shown in FIG. 2, it is apparent that the cycle life is improved in Comparative Example 2 and Examples 1 to 3 as compared with Comparative Example 1. However, it is also apparent that the cycle lives in Comparative Example 2 in which the average particle size of YF3 is equal to 0.8 μm and Example 3 in which the average particle size of YF3 is equal to 7 μm are reduced as compared with Example 1 in which the average particle size of YF3 is equal to 1 μm and Example 2 in which the average particle size of YF3 is equal to 3 μm. This is conceivably because the distribution of YF3 is localized in the negative electrode and YF3 is not sufficiently dispersed. As described above, in order to improve the cycle life, it can be seen that it is optimal to set the average particle size of YF3 to 1 μm or more and 3 μm or less.

[Battery Characterization (Low-Temperature Discharge Test)]

A step of "charging: 2 A (−$\Delta V$ charge), pause: 1 hour, discharging: 2 A (End V=1.0V), pause: 1 hour" was performed at three cycles on the battery manufactured in the above-mentioned steps under an environment of 25° C. to measure an initial capacity of the battery. Thereafter, a step of "charging: 2 A (−$\Delta V$ charge; 25° C.), pause: 3 hours (−10° C.), discharging: 2 A (End V=1.0V; −10° C.), pause: 1 hour (25° C.), discharging: 2 A (25° C.), charging: 2 A (−$\Delta V$ charging; 25° C.), pause: 3 hours (25° C.), discharging: 2 A (End V=1.0V; 25° C.)" was performed to measure the discharge capacity, and the ratio between the 25° C. discharge capacity and the −10° C. discharge capacity was defined as a low-temperature discharge ratio.

As shown in FIG. 2, it is apparent that the low-temperature discharge ratio decreases in Comparative Example 2 in which the average particle size of YF3 was equal to 0.8 μm as compared with Comparative Example 1 in which no YF3 was added, whereas the low-temperature discharge ratio increases in Example 1 in which the average particle size of YF3 is equal to 1.0 μm, Example 2 in which the average particle size of YF3 is equal to 3.0 μm, and Example 3 in which the average particle size of YF3 is equal to 7.0 μm. As described above, in order to improve the low-temperature discharge characteristics, it can be seen that it is optimal to set the average particle size of YF3 to 1 μm or more and 7 μm or less.

An exemplary embodiment of the present disclosure has been described above. However, the present invention is not limited to the nickel hydrogen secondary battery 2 according to the above-mentioned embodiment, and includes any aspect contained in the concept of the present disclosure and the scope of claims, and the respective configurations thereof may be selectively combined as appropriate. Further, the shapes, materials, arrangements, sizes, etc. of the respective components in the above embodiment can be appropriately changed depending on specific embodiments of the present disclosure.

What is claimed is:

1. A negative electrode for an alkaline storage battery, the negative electrode comprising: a negative electrode core body formed of metal; and a negative electrode mixture layer that contains at least a hydrogen storage alloy and yttrium fluoride, and is carried on the negative electrode core body, wherein the particles of the yttrium fluoride are formed so that the average particle size thereof is equal to 1 μm or more and 3 μm or less.

2. The negative electrode for an alkaline storage battery according to claim 1, wherein particles of the hydrogen storage alloy are formed so that an average particle size thereof is equal to 15 μm or more and 90 μm or less.

3. An alkaline storage battery comprising:
   an electrode group including the negative electrode according to claim 1, a positive electrode, and a separator arranged between the positive electrode and the negative electrode; and
   an outer packaging can having electrical conductivity in which the electrode group is accommodated together with an alkaline electrolytic solution.

* * * * *